Sept. 8, 1970 G. D. CLAPP ET AL 3,527,888
MEANS FOR SEPARATING HORIZONTAL AND VERTICAL
VIDEO SYNCHRONIZING PULSES
Filed April 10, 1968 2 Sheets-Sheet 1

INVENTORS.
GARY D. CLAPP,
LANCE E. RIGGIN and
DONALD R. WILLIS

H. H. Losche
Attorney

Sept. 8, 1970 G. D. CLAPP ET AL 3,527,888

MEANS FOR SEPARATING HORIZONTAL AND VERTICAL VIDEO SYNCHRONIZING PULSES

Filed April 10, 1968 2 Sheets-Sheet 2

INVENTORS.
GARY D. CLAPP,
LANCE E. RIGGIN and
DONALD R. WILLIS

H. H. Losche
Attorney

United States Patent Office 3,527,888

Patented Sept. 8, 1970

3,527,888

MEANS FOR SEPARATING HORIZONTAL AND VERTICAL VIDEO SYNCHRONIZING PULSES

Gary D. Clapp and Lance E. Riggin, Indianapolis, and Donald R. Willis, Fort Wayne, Ind., assignors to the United States of America as represented by the Secretary of the Navy Filed Apr. 10, 1968, Ser. No. 720,179
Int. Cl. H03k 5/20; H04n 5/10
U.S. Cl. 178—7.5 5 Claims

ABSTRACT OF THE DISCLOSURE

A video synchronizing pulse separation circuit for separating a composite video wavetrain comprised of nonserrated vertical and horizontal synchronizing pulses without picture content into two separate channels, one for vertical pulses and the other for horizontal pulses. The composite wavetrain is applied as an input signal to an inverting and differentiating means which couples it to a horizontal gating circuit, a vertical gating circuit, and a ramp generator. The horizontal gating circuit is normally "open" to permit the passage of the more frequently occurring horizontal pulses in the input signal to the horizontal channel output means, while the vertical gating circuit is normally "closed" to prevent passage of these horizontal pulses to the vertical channel output means. The ramp generator produces a ramp function output signal whose maximum amplitude is dependent on the time interval between the synchronizing pulses, the longer the time interval, the higher the amplitude. The time interval immediately preceding each vertical pulse in the composite signal is considerably longer than the interval preceding a horizontal pulse, which causes the ramp function output signal to exceed a predetermined minimum level and activate a trip point amplifier means during the interval immediately preceding a vertical pulse. The trip point amplifier means causes an inhibit signal to be provided to the horizontal gating circuit to prevent the vertical pulse from passing therethrough to the horizontal channel output means, and provides an enable signal to the vertical gating circuit to cause it to open and allow the vertical pulse to pass through to the vertical channel output means. These signals are maintained by the trip point amplifier means until the trailing edge of the vertical synchronizing pulse resets the ramp generator which prepares the circuit for the following horizontal pulses by allowing the horizontal gate to return to its normally open condition and the vertical gate to return to its normally closed condition.

BACKGROUND OF THE INVENTION

This invention is in the field of electrical synchronization of video systems by means of synchronizing pulses, and more specifically in the area of circuitry for providing separation of a composite video wavetrain comprised of vertical and horizontal synchronizing pulses into a separate channel for each.

The utilization of television video systems for remote observation and guidance in both military and space vehicles is presently increasing. The airborne or ground video receiving and display systems associated with these military and space vehicles must receive the composite television video signals which include picture content, synchronizing pulses, and noise, and produce therefrom a usable video display suitable for vehicle control including guidance, and/or for obsevation of the area surrounding the vehicle. Certain of these vehicle video systems employ a nonstandard synchronizing pulse format in which the vertical pulse is not of the usual serrated form. It has been found that the conventional integrator forms of sync separator circuitry known in the art and commonly employed in commercial television receivers are not suitable for use in these systems utilizing non-serrated vertical synchronizing pulses because they are not sufficiently accurate to enable the production of an interlaced picture of satisfactory quality. Thus a need has arisen for a reliable, non-complex video synchronizing pulse separation means for accepting as an input signal a non-standard composite video wavetrain comprised of non-serrated vertical and horizontal synchronizing pulses, from which the noise and picture content has been removed by preceding video synchronizing pulse detection circuitry, and separating the composite wavetrain into separate vertical and horizontal channels. The present invention fulfills this need.

SUMMARY OF THE INVENTION

The present invention provides a video synchronizing pulse separation circuit for separating the vertical and horizontal synchronizing pulses from a composite video wavetrain into separate horizontal and vertical pulse channels. The invention would normally be utilized in an airborne or ground video receiving and display means following the video display preamplifier and synchronizing pulse detection circuitry, from which it would receive the composite wavetrain of non-serrated vertical and horizontal synchronizing pulses after removal of the video picture content and noise by the detection circuitry.

The invention is comprised of an inverting and differentiating input means, a ramp generator, a trip point amplifier, and separate gated horizontal and vertical sync channels. The input means receives the positive-going composite wavetrain comprised of non-serrated vertical and horizontal synchronizing pulses and inverts it. The input means then differentiates the inverted wavetrain and supplies that signal to the ramp generator for controlling the production of its ramp voltage. The inverted input signal, without differentiation, is also applied to a second inverting stage within the input means and then coupled to the gated horizontal and vertical sync channels. The gated horizontal channel is normally maintained in an "open" condition to permit the passage of the more frequently occurring horizontal sync pulses to a first output means. The horizontal channel also has a second output means for providing an inverted form of the horizontal pulse train available at the first output means. The gated vertical channel is normally maintained in a "closed" position to prevent the horizontal sync pulses from passing to the vertical channel output means. The ramp generator produces a ramp function output signal whose maximum amplitude is directly dependent upon the time interval immediately preceding each synchronizing pulse, the greater the time interval preceding each pulse, the higher the amplitude of the ramp signal produced by the generator. The time interval immediately preceding each vertical pulse in the composite input wavetrain is considerably longer than the interval preceding a horizontal pulse. Thus during the interval immediately preceding each vertical pulse, the output signal of the ramp function generator exceeds a predetermined minimum level and activates a trip point amplifier to which it is coupled. The trip point amplifier then causes an inhibit signal to be provided to the gated horizontal channel preventing the immediately following vertical sync pulse from passing through the horizontal channel to its output means, and also provides an enabling signal to the gated vertical channel causing it to open and allow the immediately following vertical sync pulse to pass through to its output means. These respective inhibit and enable signals are continued by the trip point amplifier means until the trailing edge of the vertical synchronizing pulse resets the ramp generator thereby preparing the circuit for following horizontal pulses by causing the trip point amplifier to return the gated horizontal channel to its normally open condition by withdrawing its inhibit signal, and to return the gated vertical channel to its normally closed condition by withdrawing its enable signal. Thus the invention separates the composite wavetrain into individual horizontal and vertical channels and provides regular and inverted outputs of each for use by subsequent video display circuitry.

BRIEF DESCRIPTION OF THE DRAWINGS

The objects and the attendant advantages, features, and uses of the invention will become apparent from the following detailed description of the invention when considered in conjunction with the accompanying drawings in which like reference numerals designate like parts throughout the figures thereof, and wherein.

DESCRIPTION OF THE PREFERRED EMBODIMENT

Figure 1:
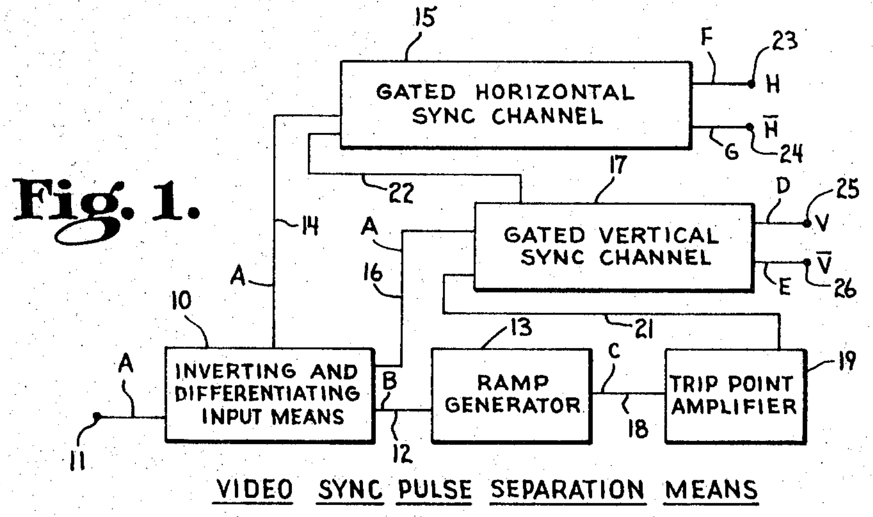
FIG. 1 depicts a block diagram of the video synchronizing pulse separation means comprising this invention.

Referring more particularly to the embodiment of the invention shown in FIG. 1 in block diagram form, an inverting and differentiating input means 10 has an input terminal 11 for receiving the composite wavetrain from preceding detector circuitry, a first output terminal coupled via a conductor 12 to a ramp generator means 13, a second output terminal coupled via a conductor 14 to a gated horizontal sync channel means 15, and a third output terminal coupled via a conductor 16 to a gated vertical sync channel means 17. The output of ramp generator 13 is coupled via a conductor 18 to a trip point amplifier means 19 whose output is coupled via a conductor 21 to vertical channel 17, which is further coupled via conductor 22 to horizontal channel 15. Horizontal channel 15 has output means 23 and 24 for providing thereat the separated horizontal (H) and inverted horizontal ($\overline{H}$) synchronizing pulses respectively, and vertical channel 17 has output means 25 and 26 for providing thereat the separated vertical (V) and inverted vertical ($\overline{V}$) synchronizing pulses respectively, for utilizaiton by associated circuitry. The letters A through G indicate the points of reference for the various representative waveforms shown in FIG. 2.

Figure 2:
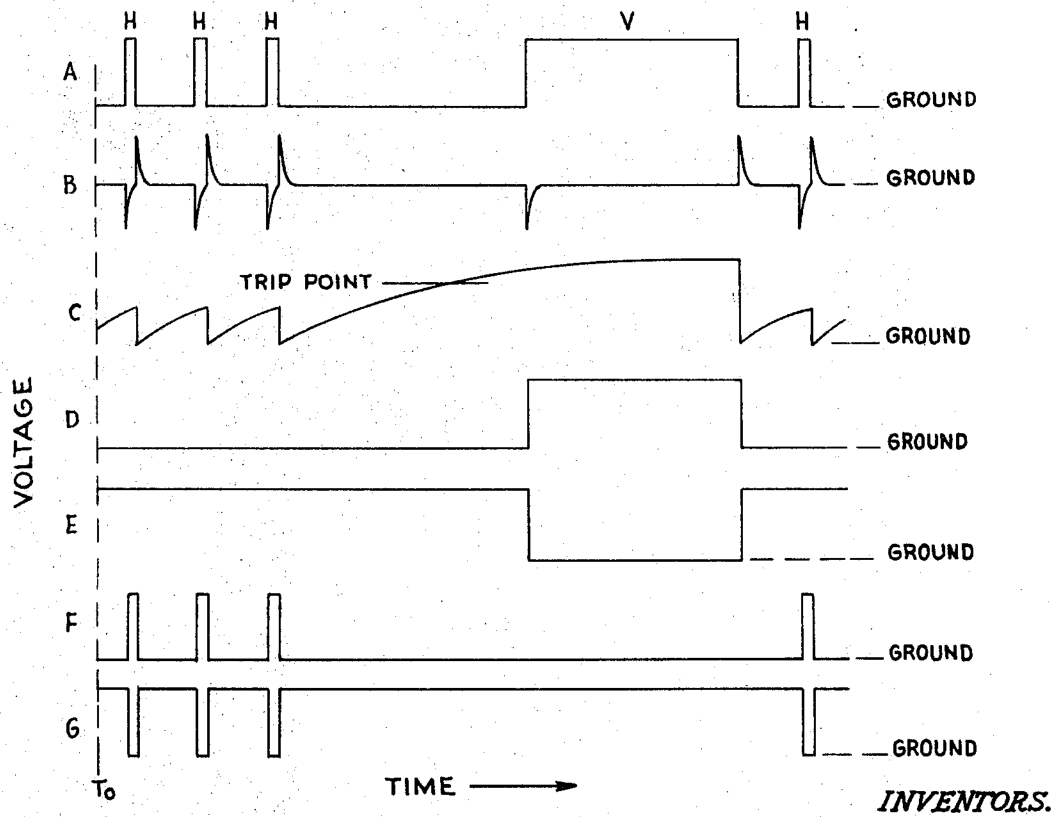
FIG. 2 represents waveforms of a typical signal at various reference points throughout the embdoiment of the invention shown in FIG. 1.

With reference to FIG. 2, the waveforms A through G represent a typical signal at the various reference points throughout the embodiment of the invention as shown in FIG. 1. Waveform A is representative of the composite input wavetrain comprised of non-serrated vertical and horizontal synchronizing pulses applied to input terminal 11, and by inverting and differentiating means 10 via conductors 14 and 16 to horizontal and vertical channels 15 and 17, respectively. Waveform B represents the inverted and differentiated signal of the type provided by input means 10 via conductor 12 to ramp generator 13 for controlling the production of its ramp function signal shown as waveform C, which is coupled via conductor 18 to trip point amplifier 19 to control its production of gating signals for gated horizontal and vertical channels 15 and 17, respectively. Waveforms D and E represent the vertical and inverted vertical synchronizing pulses present at output terminals 25 and 26, respectively, of vertical channel 17, while waveforms F and G are representative of the horizontal and inverted horizontal synchronizing pulses present at output terminals 23 and 24 respectively of horizontal channel 15.

Figure 3:
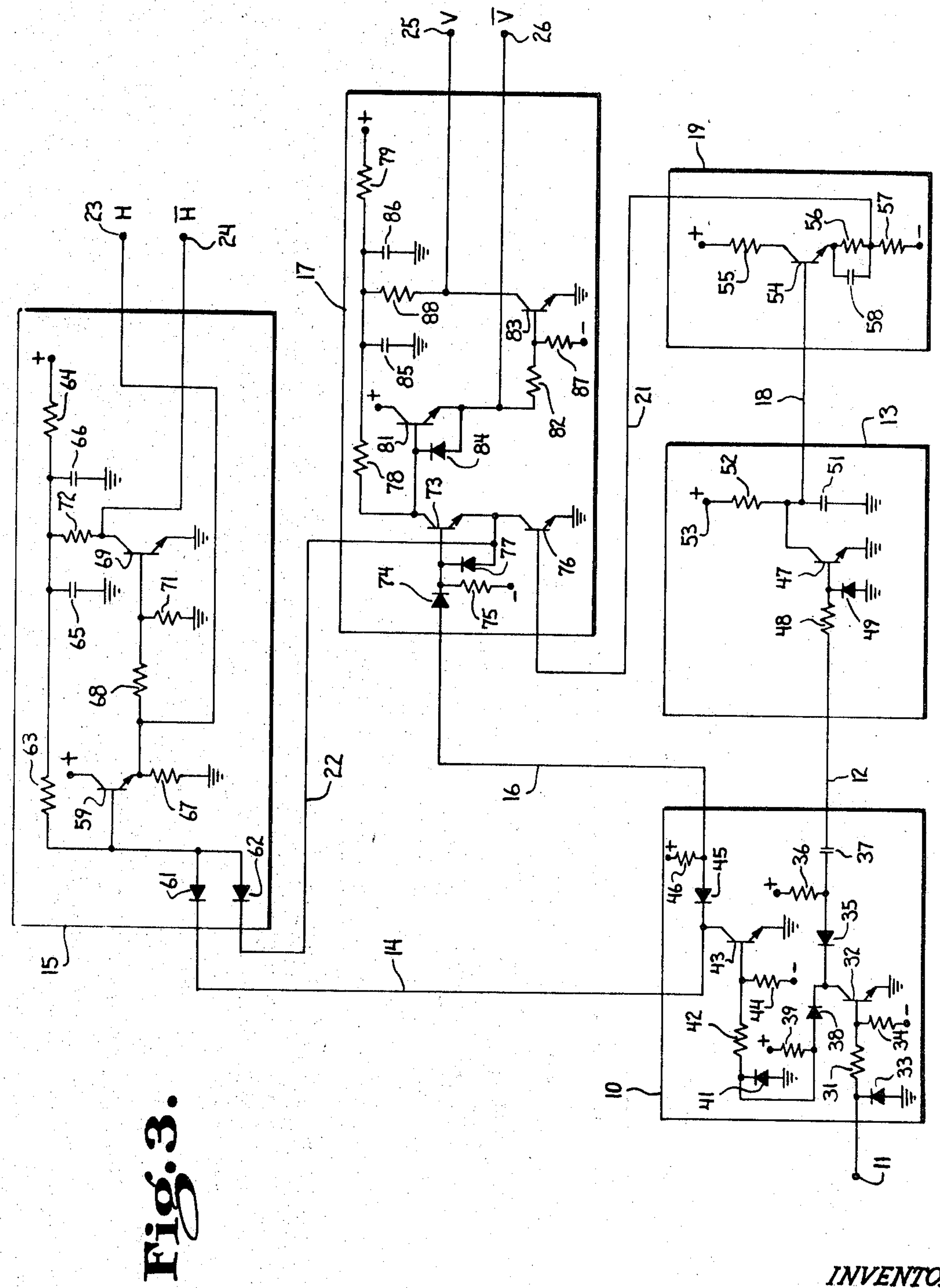
FIG. 3 is a schematic diagram of circuitry suitable for use in each of the blocks of the embodiment of the invention shown in FIG. 1.

Referring to FIG. 3, there is shown a schematic embodiment of circuitry suitable for use in the various blocks of FIG. 1. The inverting and differentiating means 10 has its input terminal 11 coupled via a resistance 31 to the base electrode of an inverting transistor 32, and is also coupled via a diode 33 to ground potential. Transistor 32 also has its base electrode coupled via a resistance 34 to a negative direct current (D.C.) source, its emitter electrode coupled to ground potential, and its collector electrode coupled via a diode 35 and a resistance 36 to a positive D.C. source. A capacitance 37 has one terminal coupled to the junction of diode 35 and resistance 36, and the other terminal coupled to conductor 12. The collector electrode of transistor 32 is also coupled via a diode 38 and a resistance 39 to a positive D.C. source, via a diode 41 to ground potential, and via a resistance 42 to the base electrode of a second inverting transistor 43. A resistance 44 is coupled between a negative D.C. source and the base electrode of normally conducting transistor 43. The collector electrode of transistor 43 is coupled to conductor 14, and via a diode 45 and a resistance 46 to a positive D.C. source. The junction of diode 45 and resistance 46 is coupled to conductor 16.

Ramp generator 13 has a control transistor 47 whose base electrode is coupled via a resistance 48 to conductor 12 and via a diode 49 to ground potential. The emitter electrode of transistor 47 is coupled to ground potential, and the collector electrode is coupled to one terminal of a ramp generating capacitance 51 which is also coupled via a charging resistance 52 to a source of positive direct current potential 53, while the other terminal of capacitance 51 is coupled to ground potential. Conductor 18 is coupled to the junction of capacitance 51 and resistance 52.

Trip point amplifier 19 has a transistor 54 with its base electrode coupled to conductor 18, its collector electrode coupled via a resistance 55 to a positive D.C. source, and its emitter electrode coupled via resistances 56 and 57 to a negative D.C. source. A capacitance 58 is coupled in parallel with resistance 56. Conductor 21 is coupled to the junction of resistances 56 and 57.

Gated horizontal sync channel 15 has a transistor 59 with its base electrode coupled via a diode 61 to conductor 14, via a diode 62 to conductor 22, and via resistances 63 and 64 to a positive D.C. source. Capacitances 65 and 66 are coupled in parallel with each other between the junction of resistances 63 and 64, and ground potential. The collector electrode of transistor 59 is coupled to a positive D.C. source, while its emitter electrode is coupled directly to output terminal 23, via resistance 67 to ground potential, and via a resistance 68 to the base electrode of an inverting transistor 69 which is also coupled via a resistance 71 to ground potential. Transistor 69 has its emitter electrode coupled to ground potential and its collector electrode coupled directly to output terminal 24, and via resistance 72 to the junction of resistances 63 and 64.

Gated vertical sync channel 17 has a transistor 73 with its base electrode coupled via a diode 74 to conductor 16, and via a resistance 75 to a negative D.C. source. The emitter electrode of transistor 73 is coupled to the collector electrode of a transistor 76, which has its base electrode coupled to conductor 21 and its emitter electrode coupled to ground potential. Conductor 22 is coupled to the collector electrode of transistor 76 and a diode 77 is coupled between the base and collector electrodes of transistor 73. The collector electrode of transistor 73 is coupled via resistances 78 and 79 to a positive D.C. source, and to the base electrode of a transistor 81 whose collector electrode is coupled to a positive D.C. source and whose emitter electrode is coupled directly to output terminal 26 and via a resistance 82 to the base electrode of an inverting transistor 83. A diode 84 is coupled between the base and emitter electrodes of transistor 81. A pair of capacitances 85 and 86 are coupled in parallel between the junction of resistances 78 and 79, and ground potential. The base electrode of transistor 83 is coupled via a resistance 87 to a negative D.C. source, its emitter electrode is coupled to ground potential, and its collector electrode is coupled directly to output terminal 25, and via a resistance 88 to the junction of resistances 78 and 79.

For convenience in specifically describing one operative example of the invention, the following table lists the various elements and components shown in FIG. 3 of the drawing, with suitable values and types therefor. While this example of a working embodiment is provided herein, it is to be understood that these elements, components, and values are in no way intended to limit the invention thereto, as other values and other components of a like nature may be utilized to accomplish similar results.

TABLE

| | |
|---|---|
| **Inverting and differentiating input means 10** | |
| Transistors **32** and **43** | 2N2369 |
| Diodes **33, 35, 38,** and **41** | FD100 |
| Capacitance **37** ___ picofarads | 380 |
| Resistances: | |
| **31** and **42** ___ ohms | 4,300 |
| **34** and **44** ___ do | 33,000 |
| **36** ___ do | 5,100 |
| **39** ___ do | 2,200 |
| **46** ___ do | 6,200 |
| **Ramp generator 13** | |
| Transistor **47** | 2N2369 |
| Diode **49** | FD100 |
| Capacitance **51** ___ microfarad | .01 |
| Resistances: | |
| **48** ___ ohms | 560 |
| **52** ___ do | 36,000 |
| **Trip point amplifier 19** | |
| Transistor **54** | 2N2369 |
| Capacitance **58** ___ picofarads | 100 |
| Resistances: | |
| **55** ___ ohms | 1,300 |
| **56** ___ do | 4,870 |
| **57** ___ do | 14,700 |
| **Gated horizontal sync channel 15** | |
| Transistors **59** and **69** | 2N2369 |
| Diodes **61** and **62** | FD100 |
| Capacitances **65** and **66** ___ picofarads | 1500 |
| Resistances: | |
| **63** and **72** ___ ohms | 910 |
| **64** ___ do | 180 |
| **67** ___ do | 1,000 |
| **68** ___ do | 4,300 |
| **71** ___ do | 33,000 |
| **Gated vertical sync channel 17** | |
| Transistors **73, 76, 81,** and **83** | 2N2369 |
| Diodes **74, 77,** and **84** | FD100 |
| Capacitances **85** and **86** ___ picofarads | 1,500 |
| Resistances: | |
| **78** and **88** ___ ohms | 910 |
| **75** ___ do | 150,000 |
| **79** ___ do | 180 |
| **82** ___ do | 4,300 |
| **87** ___ do | 33,000 |
| Positive D.C. potential source **53** ___ volts | +25 |
| All other positive D.C. potential sources ___ do | +12 |
| All negative D.C. potential sources ___ do | —12 |

OPERATION

The operation of the video synchronizing pulse separation means comprising the invention will be described by following the input signal as it is received at input terminal means 11 of FIG. 3 and progresses through the invention to the separate horizontal and vertical output terminal means 23, 24 and 25, 26 respectively, for use by associated circuitry.

The positive-going composite input signal comprised of non-serrated vertical vertical and horizontal synchronizing pulses (waveform A of FIG. 2) is applied to input terminal 11 from preceding video detector circuitry. This positive-going composite input signal is inverted by transistor 32 which is normally in the "OFF" state. To prevent the input signal from ever becoming negative, diode 33 is coupled from input terminal 11 to ground. Base resistance 31 and bias resistance 34 limit the current to transistor 32 during the maximum input level when a sync pulse is present, and insure that transistor 32 is cut off during the interval of minimum input level between pulses. The "parallel" combination of resistances 36 and 39 form the collector load resistance for transistor 32, while diodes 35 and 38 isolate these resistance loads from each other. The inverted waveform at the collector of transistor 32 is coupled via diode 38 and resistance 42 to the base electrode of transistor 43, which reinverts or returns the signal to its original input state and couples it via conductor 14 to normally open horizontal channel 15 for passage therethrough to output terminals 23 and 24 (waveforms F and G respectively of FIG. 2). The reinverted signal is also coupled via diode 45 and conductor 16 to normally closed vertical channel 17. The network formed by resistance 36 and capacitance 37 differentiates the inverted waveform from the collector electrode of transistor 32 to produce the positive and negative spikes of waveform B of FIG. 2, which are coupled via conductor 12 to ramp generator 13.

Ramp generator 13 produces the ramp function control signal depicted in waveform C of FIG. 2 for controlling trip point amplifier 19. The ramp portion is produced on conductor 18 as capacitance 51 is charged by positive D.C. source 53 via resistance 52. The negative spikes of differentiated waveform B represent the leading edges of vertical or horizontal sync pulses, and the positive spikes represent the trailing edges of these pulses. These spikes pass from input means 10 via conductor 12 and current limiting resistance 48 to the base of ramp generator control transistor 47 where the unnecessary negative spikes are effectively eliminated by coupling to ground via diode 49. The positive spikes, each representative of the trailing edge of a sync pulse, cause transistor 47 to conduct momentarily, thereby terminating the rising ramp portion of the waveform and resetting the ramp generator by discharging capacitance 51 to ground through the collector-emitter path of transistor 47. The maximum amplitude to which capacitance 51 will become charged before being discharged to ground through transistor 47 is directly dependent upon the time interval between succeeding trailing edges of the synchronizing pulses. This ramp function waveform C of FIG. 2 produced by ramp generator 13 is coupled via conductor 18 to trip point amplifier 19.

In trip point amplifier 19, transistor 54 is an emitter follower which supplies current to a resistive divider network comprised of resistances 56 and 57. This divider network establishes the "trip point" of amplifier 19 by determining the minimum voltage level which, when exceeded at the base electrode of transistor 54 by the ramp function waveform C from generator 13, will cause transistor 54 to permit sufficient current flow via collector load resistance 55 through the divider network to produce a potential on conductor 21 of sufficient magnitude to cause gating transistor 76 of vertical channel 17 to conduct. Resistances 56 and 57 are chosen so that this trip level, as indicated on waveform C of FIG. 2, will be exceeded only when the time interval between the trailing edge of a sync pulse and the leading edge of the following sync pulse, generally known as the "front porch" of the following pulse, is considerably greater than the maximum time interval or "front porch" occurring immediately preceding a horizontal sync pulse. This greater time interval or long "front porch" indicates that the immediately following sync pulse is a vertical pulse. During this vertical "front porch" interval ramp generator 13 is not reset because no resetting trailing edge spike occurs, and the charge on capacitance 51 is thereby allowed to increase above the trip level, causing transistor 54 to produce a potential on conductor 21 sufficient to cause gating transistor 76 to conduct. A bypass capacitance 58 speeds turnoff of transistor 76.

As previously indicated, gated horizontal sync channel 15 normally remains in an open condition, which will continue so long as conductor 22 is not coupled to ground potential via transistor 76. While horizontal channel 15 remains in this open condition, any sync pulses coupled thereto from input means 10 via conductor 14 will "pass through" the horizontal channel and be reconstructed at output terminal 23, with an inverted form thereof at output terminal 24, by the action of transistors 59 and 69 respectively. Diodes 61 and 62 effectively form an "AND" gate, and both must be reverse biased, or nonconducting, in order for transistors 59 and 69 to reconstruct sync and inverted sync pulses in response to the sync pulses applied to channel 15 via conductor 14. So long as gating transistor 76 is not caused to conduct by amplifier 19, diode 62 will remain nonconducting and the leading edge of each positive-going sync pulse applied to diode 61 via conductor 14 will reverse bias diode 61, causing the potential at the base electrode of transistor 59 to rise via resistances 63 and 64 from the positive D.C. source, allowing emitter follower transistor 59 to conduct producing a positive level at its emitter electrode, at the base electrode of inverting transistor 69, and at output terminal 23. The positive level applied to the base electrode of transistor 69 causes it to conduct, dropping its collector electrode to ground potential to produce the inverted level of the sync pulse at output terminal 24. The trailing edge of each sync pulse applied to diode 61 will cause it to become forward biased, thereby grounding the base of transistor 59 via diode 61, conductor 14, and the collector-emitter path of transistor 43, causing transistor 59 to cease conduction which returns its emitter electrode to ground potential, producing the trailing edge of the reconstructed sync pulse at output terminal 23. When the emitter electrode of transistor 59 is returned to ground potential, the base electrode of inverting transistor 69 also drops, cutting off transistor 69 which causes the potential at its collector electrode to return to its positive level, producing the trailing edge of the inverted sync pulse at output terminal 24.

Both horizontal and vertical sync pulses are applied to horizontal channel 15 from input means 10 via conductor 14, and the vertical pulses would also pass through channel 15 to horizontal output terminals 23 and 24 except for a control or "inhibit" potential (ground) applied to conductor 22 whenever trip point amplifier 19 senses a long "front porch" indicating that the immediately following sync pulse is a vertical pulse. When this condition is sensed, trip point amplifier 19 produces a potential on conductor 21 sufficient to cause gating transistor 76 in vertical channel 17 to conduct. When transistor 76 conducts, it couples the base electrode of transistor 59, via conductor 22 and diode 62, to ground potential effectively "closing" horizontal channel 15 by maintaining transistors 59 and 69 in a nonconducting condition for the duration of the following vertical pulse. Also, conducting gating transistor 76 couples the emitter electrode of transistor 73 in vertical channel 17 to ground potential to "open" channel 17 and prepare it for the following vertical sync pulse. When the leading edge of the positive-going vertical sync pulse is applied to the base electrode of transistor 73 from input means 10, via conductor 16 and diode 74, transistor 73 conducts coupling its collector electrode and the base electrode of inverting transistor 81 to ground via transistor 76. When transistor 81 ceases to conduct, the potential at its emitter electrode drops to ground via diode 84 to produce the leading edge of the inverted vertical sync pulse at output terminal 26, and to cause reinverting transistor 83 to cease conduction due to the drop in potential at its base electrode via resistance 82. When transistor 83 ceases conduction, the potential at its collector electrode rises, producing the leading edge of the reconstructed vertical sync pulse at output terminal 25. The trailing edge of the vertical input pulse applied to input terminal 11 resets ramp generator 13, causing trip point amplifier 19 to withdraw the positive potential placed on conductor 21 by the previous conduction of transistor 54. The loss of this positive bias potential at the base electrode of transistor 76 causes it to cease conduction, allowing horizontal channel 15 to return to its normally open condition in anticipation of succeeding horizontal pulses, and causing transistor 73 to cease conduction thereby closing vertical channel 16. When transistor 73 ceases conduction, transistors 81 and 83 resume conduction producing the trailing edges of the reconstructed vertical sync pulses at output terminals 26 and 25 respectively, as shown in waveforms E and D of FIG. 2. Vertical channel 17 then remains closed until ramp generator 13 and trip point amplifier 19 sense the long "front porch" of a succeeding vertical sync pulse and initiate the gating operation once again.

In horizontal channel 15, resistance 64 and capacitances 65 and 66 comprise a power supply decoupling network, while resistance 79 and capacitances 85 and 86 perform a similar function in vertical channel 17. In vertical channels 17, diode 74 insures that the base electrode of transistor 73 is negative whenever transistor 43 is saturated; diode 77 prevents the base electrode at transistor 73 from over becoming negative with respect to its emitter electrode; and diode 84 enables transistor 73 to "pull" the emitter of transistor 81 to ground potential. The inverted vertical sync signal provided at output terminal 26 has been found to be useful as a feedback control signal for preceding sync detector circuitry.

Thus may be seen in view of the foregoing explanation and figures of drawing that the invention, a solid state video synchronizing pulse separation means, is a useful and necessary device.

While many modifications and changes may be made by replacing elements and components with equivalent structures, or by changing component values for particular applications, it is to be understood that we desire to be limited in the spirit of our invention only by the scope of the appended claims.

The invention described herein may be manufactured and use by or for the Government of the United States of America for governmental purposes without the payment of any royalties thereon or therefor.

We claim:

1. A solid state video synchronizing pulse separation means comprising:

inverting and differentiating input means having an input terminal for receiving a composite video wavetrain comprised of vertical and horizontal synchronizing pulses for separation into individual vertical and horizontal channels, having a first output means for coupling said composite video wavetrain to a gated horizontal channel means, having a second output means for coupling said composite video wavetrain to a gated vertical channel means, and having a third output means for providing a differentiated form of said composite video wavetrain thereat;

a ramp generator for producing a ramp function output signal, having input means for coupling to said third output means of said inverting and differentiating input means to receive said differentiated form of said composite video wavetrain for controlling the production of said ramp function output signal, the maximum amplitude of said ramp function output signal being dependent upon the time interval between said synchronizing pulses in said composite video wavetrain, and having output means for providing thereat said ramp function output signal;

a trip point amplifier for producing a gating control signal in response to a predetermined level of amplitude of said ramp function output signal, said trip point amplifier having input means for coupling to said output means of said ramp generator for receiving said ramp function output signal, and having output means for providing thereat said gating control signal whenever said ramp function output signal exceeds a predetermined level indicating a vertical synchronizing pulse will follow;

gated horizontal channel menas having a first input means for coupling to said first output means of said inverting and differentiating input means to receive said composite video wavetrain, having a second input means for receiving a gate inhibiting signal to cause said gated horizontal channel means to block any vertical synchronizing pulses in said composite wavetrain from passing therethrough, and having output means for providing thereat horizontal synchronizing pulses which have been separated from said composite video wavetrain; and gated vertical channel means having a first input means for coupling to said second output means of said inverting and differentiating input means to receive said composite video wavetrain, having a second input means coupled to said output means of said trip point amplifier for receiving said gating control signal to cause said gated vertical channel means to pass therethrough any vertical synchronizing pulses in said composite wavetrain, having a gating output means for coupling to said second input means of said gated horizontal channel means for providing said gate inhibiting signal thereto upon receipt of said gating control signals from said trip point amplifier, and having output means for providing thereat vertical synchronizing pulses which have been separated from said composite video wavetrain.

2. A solid state video synchronizing pulse separation means as set forth in claim 1 wherein said ramp generator includes:

a capacitive storage means coupled across a source of direct current charging potential for providing said ramp function output signal to said ramp generator output means; and a transistor switch means coupled between said ramp generator input means and said storage means for controlling the maximum level of charge thereof in accordance with said time interval between said synchronizing pulses.

3. A solid state video synchronizing pulse separation means as set forth in claim 1 wherein said trip point amplifier includes a transistor means having its control electrode coupled to said trip point amplifier input means for receivind said ramp function output signal, and its collector electrode resistively coupled to a source of positive direct current potential; and a resistive voltage divider having one end terminal coupled to the emitter electrode of said trip point amplifier transistor means, having the other end coupled to a source of negative direct current potential, and having an intermediate terminal coupled to said trip point amplifier output means for providing thereat said gating control signal.

4. A solid state video synchronizing pulse separation means as set forth in claim 2 wherein said trip point amplifier includes a transistor means having its control electrode coupled to said trip point amplifier input means for receiving said ramp function output signal, and its collector electrode resistively coupled to a source of positive direct current potential; and a resistive voltage divider having one end terminal coupled to the emitter electrode of said trip point amplifier transistor means, having the other end coupled to a source of negative direct current potential, and having an intermidiate terminal coupled to said trip point amplifier output means for providing thereat said gating control signal.

5. A solid state video synchronizing pulse separation means as set forth in claim 3 wherein said ramp generator includes:

a capacitive storage means coupled across a source of direct current charging potential for providing said ramp function output signal to said ramp generator output means; and transistor switch means coupled between said ramp generator input means and said storage means for controlling the maximum level of charge thereof in accordance with said time interval betwen said synchronizing pulses.

References Cited

UNITED STATES PATENTS

| | | | |
|---|---|---|---|
| 2,508,923 | 5/1950 | Mautner | 178—69.5 |
| 2,583,021 | 1/1952 | Smyth | 178—7.3 |
| 2,887,530 | 5/1959 | Pacini | 178—7.3 |
| 2,924,654 | 2/1960 | Smeulers | 178—7.3 |

RICHARD MURRAY, Primary Examiner

J. C. MARTIN, Assistant Examiner

U.S. Cl. X.R.

307—234; 328—111